United States Patent

[11] 3,576,298

[72] Inventors Burton Barnett
Los Alamitos;
Frederick Raymes, Los Angeles; Thomas A. Sackinger, Hacienda Heights, Calif.
[21] Appl. No. 682,489
[22] Filed Nov. 13, 1967
[45] Patented Apr. 27, 1971
[73] Assignee North American Rockwell Corporation

[54] AEROSPACE VEHICLE
18 Claims, 9 Drawing Figs.
[52] U.S. Cl. ............................................. 244/1, 244/36
[51] Int. Cl. ............................................. B64g 1/20
[50] Field of Search ............................................. 244/1, 43, 46, 36, 3.21, 3.22, 13; 239/265.35; 60/271, 250; DES.71/6, 9, 12

[56] References Cited
UNITED STATES PATENTS

| | | | |
|---|---|---|---|
| 2,357,200 | 8/1944 | Hollingsworth | 244/46X |
| 2,596,644 | 5/1952 | Bradford et al. | 60/271X |
| 3,122,098 | 2/1964 | Gin et al. | 60/271X |
| 3,128,970 | 4/1964 | Tinajero et al. | 244/100 |
| 3,262,655 | 7/1966 | Gillespie, Jr. | 244/1(SS) |
| 3,276,722 | 10/1966 | Eggers, Jr. et al. | 244/1(SS) |
| 3,403,873 | 10/1968 | Bell et al. | 244/3.21 |
| 2,504,137 | 4/1950 | Lewis | 244/13 |
| 2,511,502 | 6/1950 | Gluhareff | 244/13 |
| 2,805,032 | 9/1957 | Davis | 244/91X |
| 2,924,400 | 2/1960 | Ruget | 244/46 |

OTHER REFERENCES
AVIATION WEEK & SPACE TECHNOLOGY, July 23, 1962 pgs. 40, 41, 42, 43 & 44

*Primary Examiner*—Milton Buchler
*Assistant Examiner*—Jeffrey L. Forman
*Attorneys*—William R. Lane, Allan Rothenberg and Richard D. Seibel ABSTRACT: An aerospace vehicle is described comprising a substantially conical forward crew compartment or command module mated to a substantially cylindrical rearward service module. Aerodynamic fairings are provided along the midline on the sides of the cylindrical portion and a substantial distance aft thereof for providing lift at hypersonic velocities and approximately vertical fins are provided on the fairings for aerodynamic stability and control. Wings are mounted within the aerodynamic fairings at high velocities and pivotably extended therefrom at lower velocities and altitudes to provide low speed lift. Upon reentry into the earth's atmosphere hypersonic lift is provided by the body and the fairings for bringing the vehicle to the area of a selected landing site and, at lower flight speeds deeper into the atmosphere, augmented lift is provided by the extended wings for landing the vehicle on a conventional runway. A rocket engine for propulsion has a large expansion ratio bell for use in the vacuum of space. The large ratio bell is jettisonable to give a low expansion ratio for use of the same engine within the atmosphere. Rear landing skids are pivotable into and out of the wake of the vehicle to reduce the requirement for heat shielding. Similarly, reaction control rocket motors are also pivotable into and out of the wake of the vehicle for minimizing heat protection requirements. Such a vehicle is readily adaptable to a broad variety of space missions such as cargo ferry or satellite recovery, and is reuseable with minimum refurbishment.

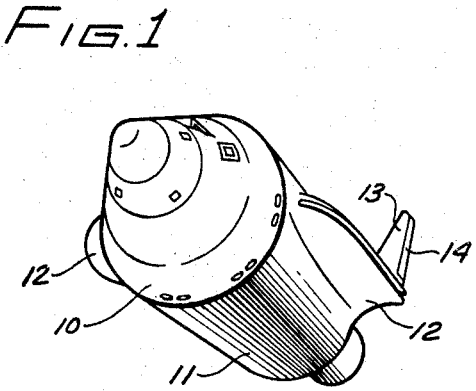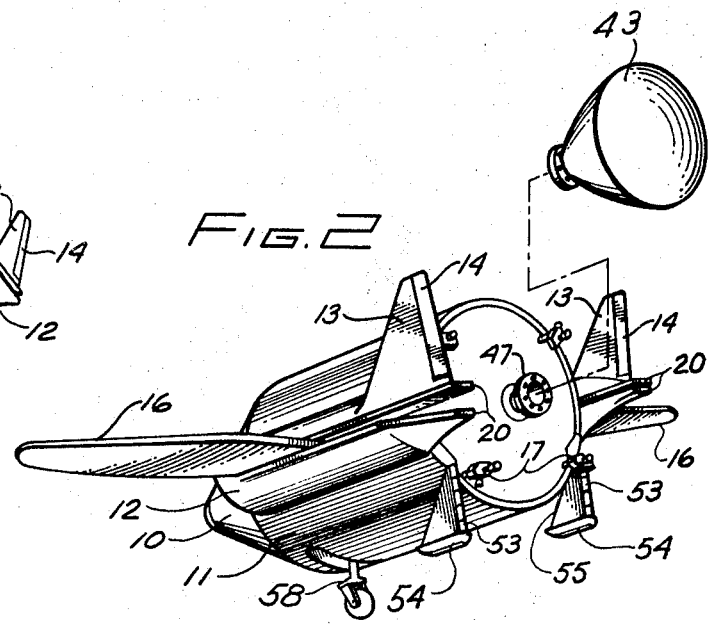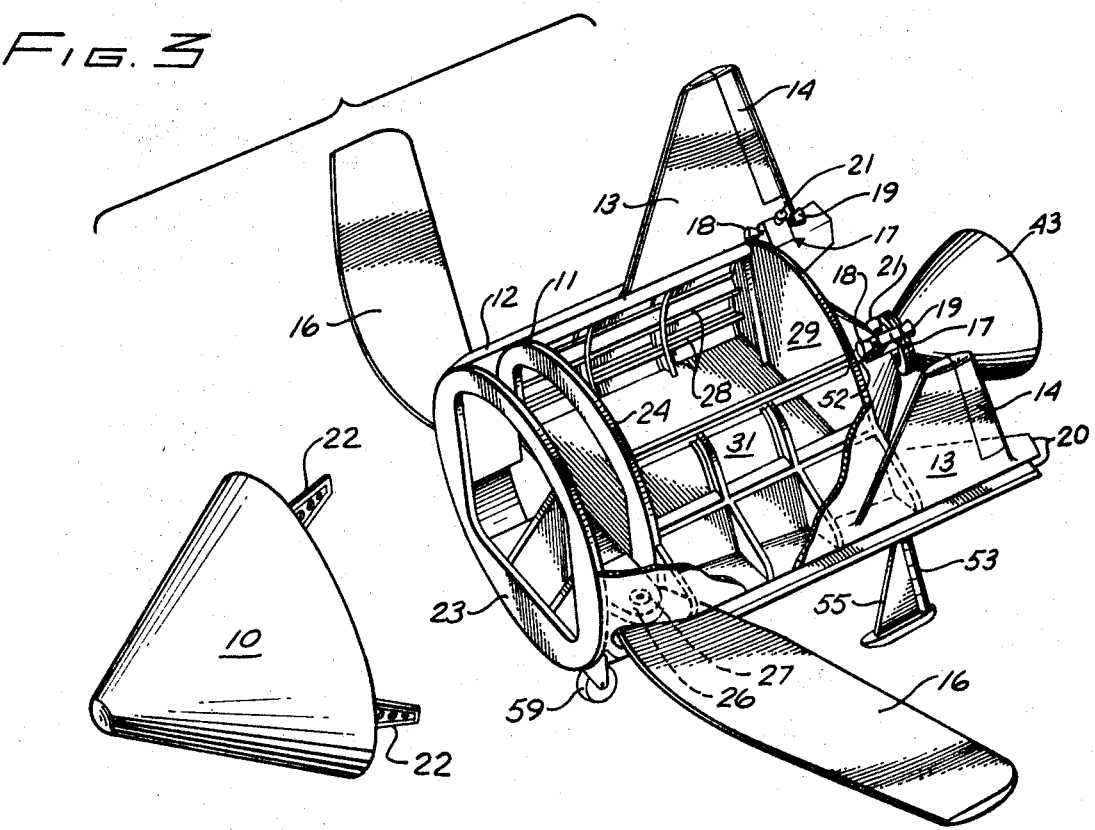

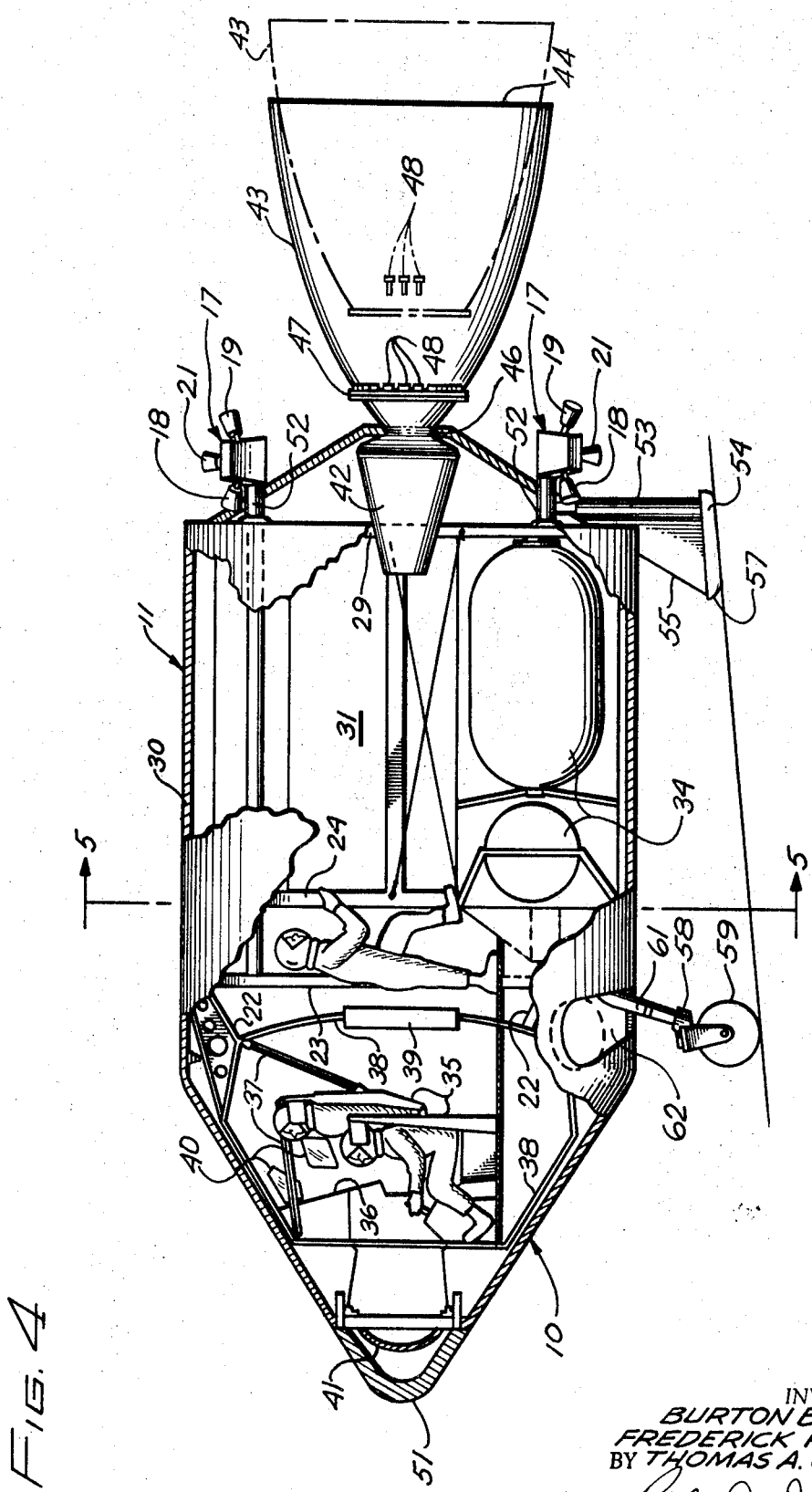

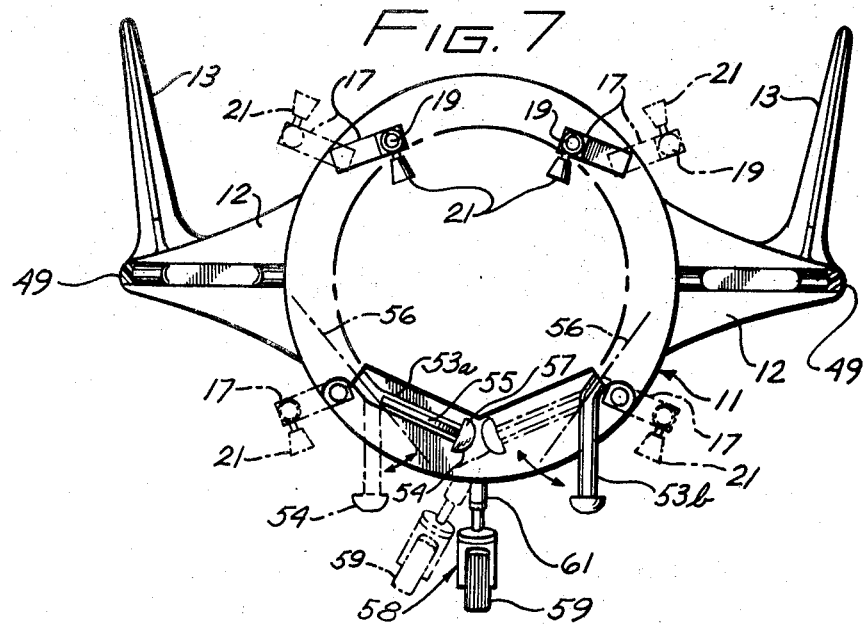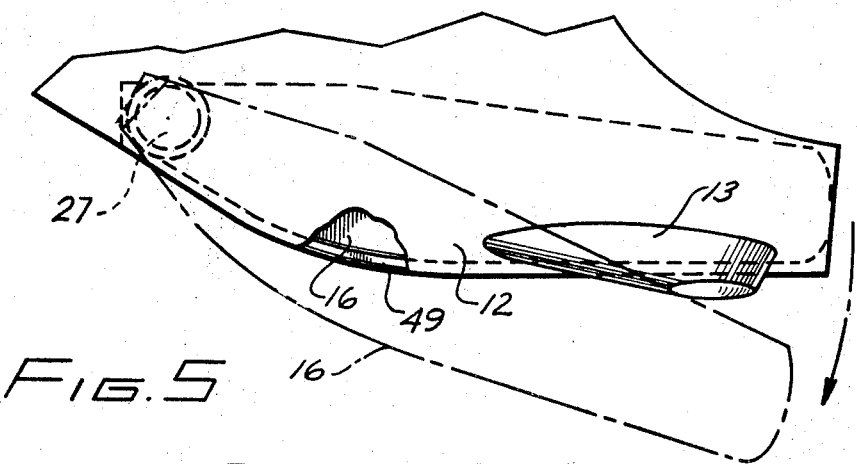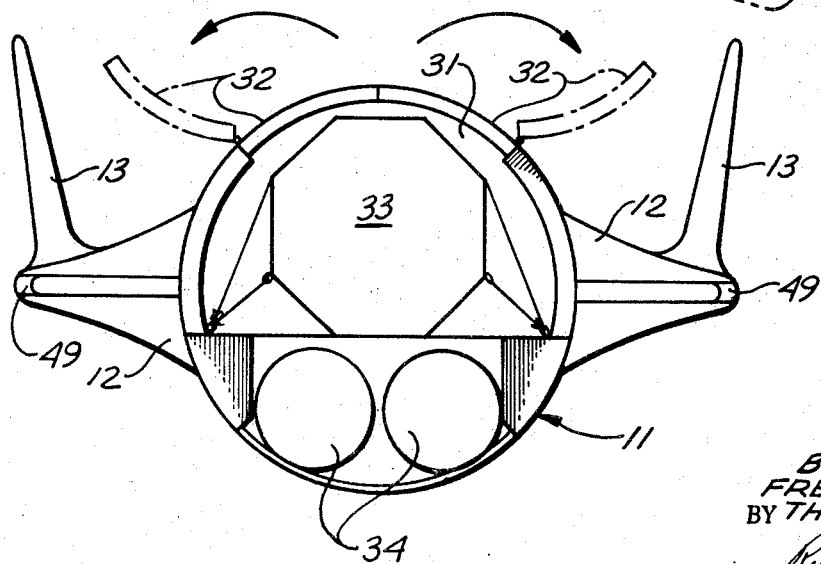

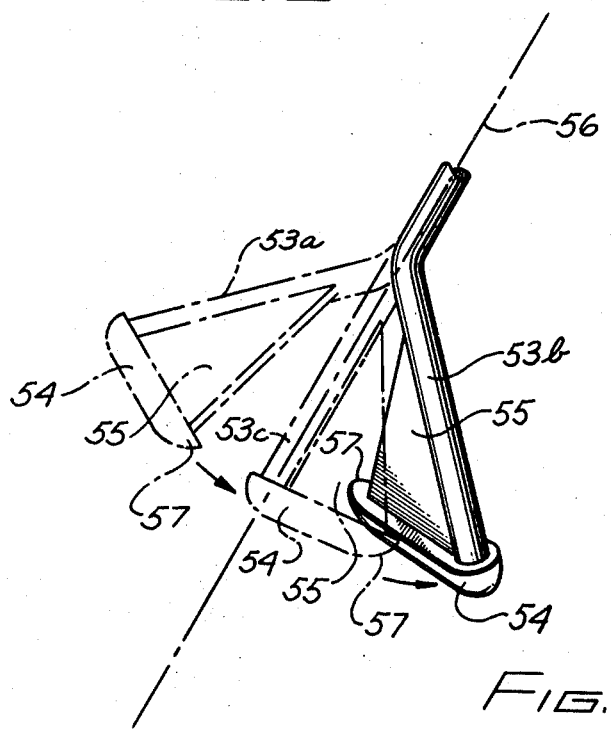
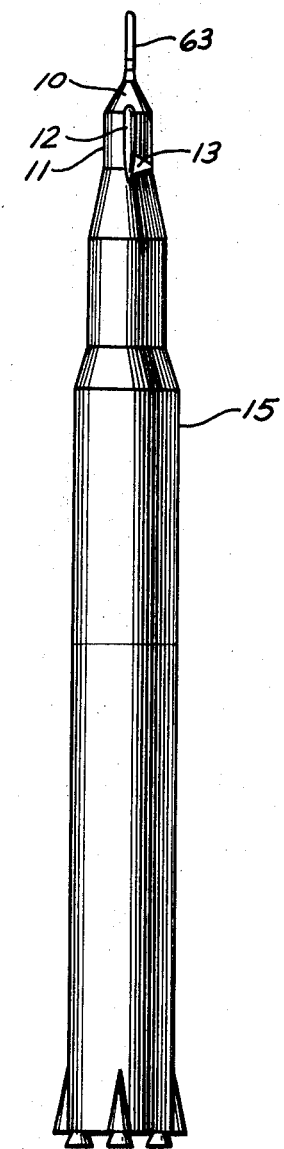
INVENTORS.
BURTON BARNETT
FREDERICK RAYMES
BY THOMAS A. SACKINGER
Richard D. Seibel
ATTORNEY

AEROSPACE VEHICLE

BACKGROUND

Manned spacecraft employed to date have been characterized by very limited hypersonic maneuverability with a lift-over-drag ratio (L/D) of only about 0.3. In addition, the vehicles have had virtually no subsonic lift and have been lowered by parachutes into the ocean. This combination of design characteristics, although quite suitable for early space exploration purposes, is not very attractive for more routine space operations. It is desirable to have a ferry logistics vehicle for shuttling men, equipment, and expendable materials such as fuel to an orbiting space station such as a manned orbital laboratory. It is also desirable to have a vehicle for orbital maneuvering to approach a satellite and for containing the satellite for recovery.

For maximum reusability it is desirable to have a vehicle that is land landable under airplanelike control conditions with flying qualities at least as good as the X-15 aircraft, manufactured by North American Aviation, Inc. Thus, it is desirable to have a vehicle having a hypersonic L/D of at least one and a subsonic L/D of at least three. Such a vehicle should be adaptable to carrying a varying number of crew members or carrying a substantial cargo. In addition, such a vehicle may be adaptable to other space missions such as, for example, satellite recovery and return.

Lifting reentry vehicles designed to date are characterized by good lift and control features, however, the vehicles are generally fairly long and flat with relatively poor volumetric efficiency so that a relatively small cargo volume is available within the vehicle. In addition, lifting bodies designed to date are very asymmetrical from top to bottom or in profile view, and require special adaptations to rocket boosters in order to have acceptable characteristics during the launch phases of a mission. When mounted on a cylindrical rocket booster the asymmetrical lifting bodies must be canted or offset or both to properly locate the center of gravity and the center of lift to prevent the launch vehicle from veering to one side. A vehicle as provided in practice of this invention is fitted symmetrically on conventional boosters without problems.

The reentry vehicle for the Apollo Lunar Landing program, manufactured by North American Rockwell Corporation, comprises a command module in the general shape of a cone which accommodates three crew members facing toward the apex of the cone. During space flight the command module is mated to a cylindrical service module which contains fuel, life support systems and a restartable rocket engine for space maneuvering. At the end of a space flight the entire service module is jettisoned and the command module is oriented so as to enter the earth's atmosphere with the blunt aft end forward, that is, with the crew facing rearwardly along the line of flight. An ablative heat shield on the aft end of the command module helps dissipate the energy of reentry and afford thermal protection for the crew. After the command module is slowed by aerodynamic friction, parachutes are deployed and the module is lowered into the ocean.

BRIEF SUMMARY OF THE INVENTION

In the practice of this invention, according to a preferred embodiment there is provided an aerospace vehicle with a high degree of symmetry comprising a body having substantial bilateral aerodynamic symmetry about two orthogonal planes extending longitudinally thereof and a pair of aerodynamic fairings located along the midline thereof on one of the planes of symmetry for providing lift at hypersonic velocities. Further, in one embodiment there may be provided selectively pivotable wings extendable from the fairings for providing additional lift at subsonic velocities. In one embodiment a blunt aft end on the vehicle provides a low velocity region in an aerodynamic wake behind the body for affording thermal protection for elements of the vehicle in the low velocity region. A rocket engine with a jettisonable expansion bell provides thrust optimized for both space and the atmosphere with the same engine.

Objects and many of the attendant advantages of this invention will be readily appreciated as the same becomes better understood by reference to the following detailed description when considered in connection with the accompanying drawings wherein:

FIG. 1 illustrates in perspective an aerospace vehicle as employed in space;

FIG. 2 illustrates in perspective the vehicle of FIG. 1 with wings and landing gear extended for landing;

FIG. 3 illustrates in perspective cutaway some of the internal structure of the vehicle of FIG. 1;

FIG. 4 comprises a side section of the vehicle of FIG. 1 further illustrating additional details of the interior;

FIG. 5 comprises a transverse section of the vehicle of FIG. 4;

FIG. 6 further illustrates the extendable wing arrangement on the vehicle of FIG. 1;

FIG. 7 comprises an aft view of the vehicle of FIG. 1 illustrating certain movable elements;

FIG. 8 further illustrates in perspective the landing gear of the vehicle of FIG. 1; and FIG. 9 illustrates a booster for the aerospace vehicle.

Throughout the drawings like reference numerals refer to like parts.

An aerospace vehicle as provided in the practice of this invention according to a preferred embodiment employs modifications of many of the basic elements developed in the course of the Apollo Lunar Landing Program for maximum utilization of the national investment in this program. Thus, as illustrated in FIG. 1 there is provided a substantially conical command module 10 mated to a substantially cylindrical service module 11. The cone and cylinder are blended together for aerodynamic smoothness and the apex of the cone is somewhat rounded for optimum distribution of heat load thereon during reentry. A pair of aerodynamic fairings 12 are symmetrically located on opposite sides of the service module 11 substantially along the midline thereof so that the vehicle has substantial bilateral symmetry from top to bottom as well as from side to side. It is preferred that the leading edge of the fairings 12 be essentially a continuation of the conical line of the command module 10. If desired the fairings 12 may extend a short distance forward on the conical command module and diverge somewhat more rapidly than the cone. The aerodynamic fairings 12 provide lift for the aerospace vehicle at hypersonic velocities when the angle of attack of the vehicle is in the range of from about 10° to 30°. A pair of fins 13 are provided on the outboard edge of the fairings 12 toward the aft end thereof for providing lateral stability. The fins 13 diverge slightly from each other, each being about 10° off vertical. Rudders 14 form a portion of the trailing edge of the substantially vertical fins 13 for providing yaw control in the atmosphere.

Bilateral symmetry in plan view is, of course, quite conventional in aircraft relying on aerodynamic lift from the atmosphere. Heretofore aircraft have been asymmetrical in profile view in order to obtain lift from aerodynamic shaping without assuming unduly high angles of attack. Similarly aerospace reentry vehicles have either been symmetrical for ballistic travel with insignificant lift or have been asymmetrical in profile to obtain a compromise between hypersonic and subsonic lift. Conventional launch boosters for reentry vehicles are symmetrical cylinders with no significant side loads during launch of symmetrical vehicles. Placing an asymmetrical reentry vehicle on a conventional booster leads to side loads on the booster during some phases of launch thereby applying heavy bending loads on the long boosters and requiring steering during launch to prevent the entire vehicle from deviating from a desired flight path.

A vehicle as provided in practice of this invention is substantially symmetrical in profile view except for nearly vertical fins 13 which have no substantial effect on aerodynamic lift.

Because of this profile symmetry conventional launch boosters are suitable without modification for side loads or greater steering capability.

Referring again to the drawings, FIG. 9 illustrates a typical launch booster combination 15 with the preferred aerospace vehicle mounted thereon. The booster 15 is a multistage cylindrical rocket booster such as the Saturn V vehicle developed for the Apollo Lunar Landing program. The service module 11 and command module 10 of the lifting reentry vehicle herein described are symmetrically located on top of the booster 15 in the same position as the corresponding modules of the Apollo Lunar Landing vehicles. The booster itself requires no modification to accommodate the aerospace vehicle since the launch loads are symmetrical and the fairings on the reentry vehicle clear the sides of the adapter between the booster and the service module.

After reentry into the earth's atmosphere and substantial slowing of the vehicle from orbital velocity due to aerodynamic friction, addition subsonic lift is provided for the vehicle by deployment of a pair of wings 16 from within the aerodynamic fairings as illustrated in FIG. 2. These wings, which are preferably of titanium or other material having suitable strength and high temperature resistance, extend laterally from the fairing for providing lift at subsonic velocities as seen in perspective in FIG. 2. An NACA 0012 airfoil provides good coefficient of lift and L/D at angles of attack in the range of about 4° to 20°.

At hypersonic velocities the wings 16 are pivoted into a first position within the fairings 12 for providing heat protection under the extreme environment of high velocity reentry. When extremely high temperature protection is no longer required, at somewhat lower velocities, the wings are pivotally deployed to their extended position from the fairings for providing lift. Conventional hydraulic, squib initiated gas generation devices, or mechanical devices using stored spring energy (not shown) are readily provided for extending the wings from the vehicle body. If desired wing deployment as provided in copending U.S. Pat. application Ser. No. 552,188, now Pat. No. 3,390,853 entitled "Variable Geometry Reentry Vehicle" can be employed. The wings deploy symmetrically to their full extent within a few seconds and are mechanically locked in the extended position until after landing. The combination of protective fairing and extendable wing increases the hypersonic performance on the one hand and permits the vehicle to make a land landing on the other with flight qualities similar to the X-15.

Flight control in the atmosphere is provided by the rudders 14 on the fins 13 and also by a pair of conventional split flaps 20 at the aft end of each of the fairings 12. Yaw control within the atmosphere is provided principally by the rudders, and pitch and roll control are provided principally by the split flaps 20.

The wings 16 are longer than the body of the service module 11 so as to present a favorable aspect ratio for good subsonic lift. The fairings 12 provide thermal protection for the wings and therefore are sufficiently long to substantially enclose the wings prior to deployment thereof. This extends the aft ends of the fairings back of the aft end of the service module which also provides an advantage in aerodynamic control. By locating the flaps 20 and rudders 14 as far as possible from the center of lift, greater control is achieved with minimized effect on drag of the vehicle. Also by locating the fins aft of the aft end of the cylindrical body, the biplane effects of interaction therebetween is minimized.

The rudder and flap controls are useful after reentry into the earth's atmosphere, that is, below altitudes of about 150,000 feet; however, other controls are required in the vacuum of space. Attitude control for the vehicle in space is provided by four sets of small attitude control rockets 17. The four sets of attitude rockets 17 are provided at the aft end of the vehicle in the upper and lower, right and left quadrants respectively. Each of the sets 17 of attitude rockets comprises three independent nozzles for attitude control.

As best seen in FIGS. 3 or 4 each set comprises a nozzle 18 directed forwardly on the vehicle, a second nozzle 19 directed aft or rearwardly on the vehicle, and a third nozzle 21 directed substantially tangential to the body of the vehicle transverse to the axis thereof. It will be readily apparent that since the nozzles are displaced from the center of gravity of the vehicle that firing of selected pairs of the forwardly directed rocket motors 18 or the rearwardly directed motors 19 provides either pitch or yaw control of the vehicle. Similarly, firing of the tangential engines 21 provides roll control. It will also be apparent that more attitude control rockets are provided than are absolutely necessary for any given control maneuver and that the inherent redundancy therefore provides greater reliability for the overall vehicle system.

Significant internal structural elements of the aerospace vehicle are illustrated in FIGS. 3 and 4. Thus, as most clearly seen in FIG. 3 the command module 10 is separable from the service module 11 and in use is connected thereto by three mounting members 22 (also seen in FIG. 4). The mounting members 22 connect the command module to a forward bulkhead 23 in the service module 11. Spaced apart from the forward bulkhead 23 is a middle bulkhead 24 which, with the forward bulkhead, forms a structural frame in which wing mounts 26 are secured to support a pivot mounting 27 for the wings 16. The wing pivot 27 is also illustrated in FIG. 6 which further shows one of the wings 16 within an aerodynamic fairing 12 in solid and, in phantom, the same wing pivoted about the bearing 27 toward its extended position. Referring again to FIG. 3 a plurality of longitudinally and circumferentially extending ribs 28 are provided as a structural skeleton in the service module between the middle bulkhead 24 and an aft bulkhead 29. The longitudinal ribs 28 serve to carry the thrust of the booster (not shown in FIG. 3) used in launching the vehicle forward to the mounting members 22 which support the command module 10. A metal skin 30 (FIG. 4) is provided on the structural skeleton for enclosing the service module, and heat protective materials are provided over the skin as hereinafter described.

The service module in the illustrated embodiment for carrying cargo includes a large storage compartment 31 in the upper portion thereof. As illustrated in phantom in FIG. 5 large cargo doors 32 on the top of the service module open most of the top to provide access to the cargo compartment 31 so that a cargo 33 such as replacement equipment, expendable stores, a recovered satellite or the like can be loaded or unloaded on the ground or in space. Beneath the floor of the cargo compartment 31 there are provided tanks 34 for containing rocket propellent, breathing oxygen, and the like. It will also be apparent that many other conventional spacecraft subsystems such as batteries, fuel cells, life support systems, navigation and control systems, communications, and the like may be accommodated in various areas of the service module or command module and are not set forth in detail herein. The specific structural arrangement of the service module is a function of the desired mission and it will be apparent that many internal modifications can be made without departing from the spirit of this invention.

Referring particularly to FIG. 4, the command module includes seats 35 in which 3 to 6 crew members are seated during launch and reentry phases of a mission and also includes control and instrumentation panels 36 of the same general type as employed in other aerospace vehicles and airplanes. The seats are mounted in the command module with shock struts 37 for attenuating high accelerations which may occur on launch or landing. The command module also includes a pressure hull 38 so that the interior thereof is pressurized in space and habitable for the crew. A pressure hatch 39 is proved at the aft end of the command module so that crew members have access to the service module during flight if desired. Forward and side looking windows 40 are provided in the command module so that the crew can visually determine position and attitude during all phases of a mission. In addition, a wide angle window 41 is provided in the nose of the vehicle within the heat shield hereinafter described for use by the command pilot during terminal maneuvers prior to landing.

Propulsion for the aerospace vehicle is provided by a conventional liquid fuel, restartable rocket engine 42. It will be apparent that other types of reaction thrust engines can be employed. When employed in space the area ratio between the engine opening and the throat must be fairly high in order to obtain maximum thrust therefrom. For this reason a large expansion bell 43 is provided on the rocket engine in order to obtain maximum thrust therefrom in the low pressure of space. It is found that an area ratio of about 40 is preferable for a space engine, that is, the cross-sectional area at the open end 44 of the bell 43 is about 40 times the cross-sectional area at the throat 46 of the rocket engine. It is found, however, that a rocket engine with an expansion ratio of 40 is not useable in the atmosphere since the ambient air pressure constricts the exhaust gas flow and may lead to serious and possibly destructive instabilities in the rocket exhaust.

For this reason a separation ring 47 is provided between the throat 46 and the open end 44 of the bell 43 so that the area ratio can be changed. Conventional explosive bolts 48 on the separation ring 47 secure the bell 43 to the engine during use in space, and if it is desired to employ the engine within the atmosphere the explosive bolts 48 are severed thereby releasing the bell 43 and jettisoning it as illustrated in phantom in FIG. 4. After jettisoning the bell 43 the area ratio of the engine is reduced to about three, that is, the cross-sectional area at the separation ring 47 is three times the cross-sectional area of the engine at the throat 46. By being able to jettison the rocket engine bell the same engine is employed for thrust in space for orbital changes and reentry deceleration and is also used in the atmosphere to augment the lift of the aerospace vehicle for obtaining maximum flexibility in traveling to a selected landing field.

A substantial factor in a successful aerospace vehicle is sufficient heat protection for dissipating the large amount of heat generated by atmospheric friction during reentry. Certain portions of the aerospace vehicle are subjected to very high heating rates due to this aerodynamic friction and a conventional phenolic base ablator or similar material is applied in these areas for dissipating the heat. Such ablators undergo phase and chemical changes and are eroded away to provide thermal protection for the underlying structure. Ablation type heat protection is provided on the nose and underside of the described aerospace vehicle where heating is most sever. Similarly the leading edges of the fairings 12 are capped with an ablative heat shield and an ablative plug 49 (FIGS. 5—7) is provided along the edge of each fairing for protection of the retracted wing during hypersonic phases of reentry. The ablative plug 49 is jettisoned when the wing deploys into its extended position for subsonic flight.

The highest surface temperature achieved on the vehicle is at the nose thereof and a jettisonable ablative cone 51 is provided thereon. Ablative material about 1½ to 2 inches thick is provided on the nose 51 for thermal protection during hypersonic reentry. The maximum surface temperature on the leading end 51 is in the order of about 3,950° F. After the nose 51 has served to dissipate this extreme heating during hypersonic reentry it is jettisoned for the subsonic landing phase of the mission to expose the window 41 so that the command pilot can readily observe the landing site.

As further examples of the heating involved in reentry of the vehicle comparison can be made between the upper and lower portions of the conical command module about half way between the apex and the base of the cone. On the bottom portion the heating rate exceeds 25 BTU/ft$^2$-second for an elapsed time of about 800 seconds during reentry with a maximum heat input during that time of about 32 BTU/ft$^2$-second. During the same period the heat input on the top side of the cone does not exceed about 5 BTU/ft$^2$-second. These heating rates yield a maximum temperature of about 3,010° F. on the bottom side of the cone and about 1770° F. on the top side of the cone. The substantially greater heating and surface temperatures on the bottom side are due to the high angle of attack during hypersonic reentry in order to obtain lift. Similarly a thermal profile at about midpoint of the service module shows a maximum surface temperature of about 2,520° F. at the bottom thereof and a maximum surface temperature of only about 960° F. at the top surface thereof. Beneath the fairings the maximum surface temperature is about 1500° F. and rises to about 1800 to 1900° F. along the edge of the fairings. These heating rates and surface temperatures are readily accommodated by conventional ablative materials in the most severe regions. The added weight of ablative on the sides of the cone is substantially balanced by deletion of heat shielding on the present command module blunt aft end.

In those regions where the heat input does not exceed about 14 BTU/ft$^2$-second, a high temperature radiative material is employed for the surface. Thus, for example, the metallic superalloy Haynes L605, or Inconel as employed on the X-15, is used on the outer surface of the service module over the skin 30 and insulated therefrom for dissipating heat. Such radiative materials are heated to elevated temperature by the aerodynamic friction of reentry and reradiate the heat due to their high emissivity at elevated temperature. Superalloys are employed for this purpose since they maintain high strength at elevated temperatures. If desired columbium and columbium based alloys may be employed in higher temperature regions on the command and service modules for radiative heat dissipation since these materials can stand considerably higher temperatures and heat fluxes than the so-called superalloys which are nickel or cobalt base.

The heat protection techniques described are principally for the forward end and sides of the aerospace vehicle. Thermal protection for the aft end of the vehicle and certain subsystems is provided by design of the vehicle rather than selection of materials. Thus in addition to varying the area ratio, jettisoning of the rocket engine bell 43 also assures that no reentry thermal protection is required for this portion of the vehicle. After jettisoning of the engine bell the aft end of the aerospace vehicle is substantially blunt (as seen in FIGS. 2 and 4) and a region having very low air velocity is provided in the wake of the vehicle. This low velocity region in the wake is employed for thermal protection of the small control rocket engines and for the rear landing gear.

The attitude rocket assemblies 17 are mounted on the blunt aft end of the service module on pivotable hollow shafts 52 (FIG. 4) that extend aft on a line parallel to the axis of the vehicle. The rocket assemblies 17 are offset from the axis of the shaft 52 so that during launch and reentry phases of a flight the attitude control assemblies 17 may be pivoted into a first position completely within the wake of the vehicle as illustrated in the solid positions of FIG. 7. After the vehicle reaches the vacuum of space the engine assemblies 17 are pivoted into a second position (shown in phantom in FIG. 7), so as to extend the forward nozzles 18 (FIG. 4, not seen in FIG. 7) beyond the sides of the vehicle. In this way the exhaust from the forward facing rocket nozzles 18 extends along the length of the vehicle and does not impinge directly on the structure thereof. It will be apparent that the rocket engines 19 facing aft on the vehicle can be used in either the extended position shown in phantom or the retracted position shown solid in FIG. 7 and can therefore be used both for attitude control in space and for augmenting the flap and rudder attitude controls during reentry. By mounting the attitude control assemblies 17 for pivoting between an effective position beyond the sides of the vehicle and a retracted position within the relatively quiescent wake of the vehicle a minimal amount of thermal protection is required thereon.

Similarly, thermal protection for the rear landing gear is provided by retaining the landing gear in the wake of the vehicle during all stages of a flight including the high heating phases of reentry and deploying the gear into a landing position only immediately before landing. It is preferred that the rear landing gear comprise a wire brush landing skid of the type successfully employed on the X-15 aircraft for landing on conventional runways. This gear essentially comprises a short bristled wire brush which slides along the runway. The bristles of the brush support the weight of the vehicle and serve to attenuate landing shocks due to their elasticity and further serve to brake the vehicle in a relatively short distance because of their high friction on the runway.

Thus, as illustrated in FIGS. 7 and 8 the rear landing skids each comprise a support shaft 53 forming the main structural member of the landing gear. On the outer end of the support shaft 53 is a skid 54 which comprises a rigid backing on which short, stiff wire bristles (not shown) are mounted for sliding on the ground. A reinforcing web 55 is provided between the skid 54 and the main support shaft 53 to accommodate bending loads upon landing. The main support shaft is angulated at its inner end so as to extend along an axis 56 which is transverse to the longitudinal axis of the vehicle and enters the main body of the vehicle along this axis. The axis 56 is the axis of an imaginary cone swept out by the main support shaft 53 of the rear landing gear when pivoted from a position within the wake to a position extended downwardly for landing.

As the portion of the shaft 53 entering the vehicle is pivoted, the main portion of the shaft supporting the skid 54 swings from a first position 53a lying adjacent the aft end of the body with the toe 57 of the skid pointed aft, to a second position 53b with the shaft 53 extending substantially vertically downward from the body with the toe 57 of the skid pointed forwardly. During deployment of the rear landing gear it swings through an intermediate position 53c shown in phantom in the perspective view of FIG. 8 wherein the main support shaft 53 extends somewhat aft from the vehicle body and the toe 57 of the skid swings from a position pointing aft towards a position pointing forward in the extended or landing position 53b. The three positions of the landing gear all have the shaft 53 on the surface of the imaginary cone of which 56 is the axis and the skid lies tangent to the base of the cone.

By swinging the landing gear from a position within the wake of the vehicle into the landing position very little thermal protection is required for the rear landing skids during reentry heating. Also, by providing simple rotational motion about a single axis 56, simple deployment of the landing gear and locking in landing position is readily provided. It will be readily appreciated that other movable structures, such as antenna, are also protectable from aerodynamic heating by location in the aerodynamic wake during reentry and movable to an operative position in space or for landing.

The forward landing gear 58 preferably comprises a wire brush wheel 59 mounted on a conventional shock strut 61. The nose landing gear 58 pivots sidewise relative to the body of the vehicle in a conventional manner into a wheel well 62 (FIG. 4) which, during reentry, is covered by an ablative plug (not shown).

In employing the aerospace vehicle as described and illustrated herein, it is mounted for launch on a conventional rocket booster and because of the substantial symmetry thereof no special mounting arrangements are required. Lift in flight is provided by selection of the angle of attack rather than solely by body shape and launching problems are thereby avoided. Existing launch vehicles can be employed without extensive adaptations which are needed for asymmetrical vehicles.

In case of an emergency on the launching pad the launch abort system 63 (FIG. 9) is substantially the same as that used on the present Apollo spacecraft except that the main solid propellent motor has a thrust of about 200,000 pounds rather than 150,000 pounds. In case of a launch abort the aerospace vehicle comprising both and command service modules are separated from the launch vehicle adapter and raised within a few seconds to approximately 3,500 feet altitude. Simultaneously, a horizontal velocity of approximately 360 feet per second is imparted to the vehicle. When the launch escape motors burn out in approximately 4 seconds after initiation of an abort the expended solid propellent motor and its associated connections are jettisoned along with the expansion bell 43 on the main rocket propulsion engine 42. Simultaneously This main engine 42 is ignited providing about 13,000 pounds of thrust for increasing the separation between the aerospace vehicle and the launch booster. After about 16 seconds the vehicle has reached an altitude of about 3,500 feet and horizontal velocity of about 360 feet per second. At this time the wings 16 are extended from the fairings 12 and the vehicle is flown to a prepared landing site either in a dead stick glide or with additional propulsion from the rocket motor 42.

Assuming no launch abort the rocket booster propels the aerospace vehicle into an orbital path around the earth for conducting a selected mission such as ferrying men or supplies to an orbiting space station, satellite surveillance, satellite recovery, or the like. Upon reaching orbit the attitude control rocket assemblies 17 are pivoted into a position extending beyond the side of the vehicle for attitude control. If desired the main propulsion rocket 42 can be employed for orbital changes and other maneuvering in space such as rendezvous with an orbiting space station or other satellite. For reentry into the earth's atmosphere the main propulsion engine 42 or the attitude control engines are employed for a decelerating thrust and the vehicle is reoriented in a nose forward position by the attitude rockets 17. These attitude rockets are then pivoted into a protected position within the wake of the aerospace vehicle. The aft directed attitude nozzles 19 are, however, still useful for attitude corrections as may be necessary prior to or after reentry into the earth's atmosphere.

In the early stages of reentry the expansion bell 43 on the rocket engine is jettisoned and the vehicle is flown dead stick towards a selected landing site with an angle of attack of about 30° for providing hypersonic lift in the range of from about 0.8 to 1.1 L/D depending on the exact fairing size. If desired, in order to reach a selected landing site, the main propulsion engine 42 can be employed for additional thrust during hypersonic flight. Upon slowing of the vehicle due to aerodynamic friction to subsonic velocities the wings 16 are deployed after ejecting the ablative plugs 49 along the edge of the fairings. The wings pivot about the pivot 27 and extend laterally from the sides of the vehicle for providing subsonic L/D of about 4.9 at a trim angle of attack of about 10° and a subsonic L/D of about 4.4 at a trim angle of attack of about 14°. The L/D obtained is higher than obtained with the X-15. Again, if desired, additional effective lift can be provided by employing the main propulsion engine 42 for added thrust. Landing flare is commenced at about 1200 feet altitude and ended at about 200 feet altitude. The landing gear 53 and 58 are pivoted into extended or landing position about 10 seconds prior to actual touchdown for minimized drag during flight.

In order to reuse the spacecraft for a subsequent mission the wings are retracted into the fairings, jettisoned parts such as the nose ablator 51, the ablative plugs 49 along the edge of the fairing, and the rocket engine bell 43, are replaced. The ablative material on the command and service modules is refurbished as required and the aerospace vehicle is thereby readied for additional missions. In all, over 98 percent of the hardware which is put into orbit is reusable.

As mentioned hereinabove the command module 10 is separable from the service module 11 and this provides for great versatility in the missions for which the aerospace vehicle can be employed. Thus the command module as presently employed on the Apollo Lunar Landing Program can be used for three crew members or can be adapted to accommodate five or six crew members since the long stroke shock attenuation mechanisms on the crew couches or seats are no longer required and additional couches can be added. Further, the command module is readily modified to accommodate nine crew members by enlarging the rear pressure bulkhead 38 and adding additional seats.

The large volume available in the service module due to its substantially cylindrical shape can be used for a variety of cargo such as additional scientific or military equipment for a space station, additional propellants or other stores for the space station. Similarly, the large volume can be employed for return of satellites or other space equipment as desired.

We claim:

1. An aerospace vehicle comprising:
   a body having substantial bilateral aerodynamic symmetry about the orthogonal planes extending longitudinally thereof;
   a pair of aerodynamic fairings symmetrically located on opposite sides of said body substantially along one of the planes of symmetry for providing lift at hypersonic velocities;
   a pair of fins, each of said fins being mounted on an outboard edge of one of said fairings and extending generally in the direction of lift therefrom;
   a landing gear at the aft end of said body and movable between a first position within the low velocity region of the aerodynamic wake and a second position extending beyond the bottom of said body for landing.

2. An aerospace vehicle comprising:
   a body having substantial bilateral aerodynamic symmetry about the orthogonal planes extending longitudinally thereof;
   a pair of aerodynamic fairings symmetrically located on opposite sides of said body substantially along one of the planes of symmetry for providing lift at hypersonic velocities;
   a pair of fins, each of said fins being mounted on an outboard edge of one of said fairings and extending generally in the direction of lift therefrom;
   said body having a conical forward portion and a cylindrical aft portion;
   said cylindrical portion including a blunt aft end for providing a low velocity region in an aerodynamic wake behind the body for providing a region of low aerodynamic heating; and
   attitude control thrust engines mounted on the aft end of the body and movable between a first position beyond the side of said body for control use in space and a second position within the low velocity region of the aerodynamic wake for protection from aerodynamic heating.

3. An aerospace vehicle comprising:
   a body having substantial bilateral aerodynamic symmetry about the orthogonal planes extending longitudinally thereof;
   a pair of aerodynamic fairings symmetrically located on opposite sides of said body substantially along one of the planes of symmetry for providing lift at hypersonic velocities;
   a pair of fins, each of said fins being mounted on an outboard edge of one of said fairings and extending generally in the direction of lift therefrom;
   said body having a conical forward portion and a cylindrical aft portion; said cylindrical portion including a blunt aft end for providing a low velocity region in an aerodynamic wake behind the body for providing a region of low aerodynamic heating; and
   a restartable rocket engine on the aft end of said body for propulsion, said engine including a large area ratio expansion bell for use in lower pressures of space; and
   means for jettisoning at least a portion of said expansion bell for reducing the area ratio of said engine for use in higher pressures within the atmosphere.

4. An aerospace vehicle comprising:
   a body having substantial bilateral aerodynamic symmetry about the orthogonal planes extending longitudinally thereof;
   a pair of aerodynamic fairings symmetrically located on opposite sides of said body substantially along one of the planes of symmetry for providing lift at hypersonic velocities;
   a pair of fins, each of said fins being mounted on an outboard edge of one of said fairings and extending generally in the direction of lift therefrom;
   said body having a conical forward portion and a cylindrical aft portion;
   said cylindrical portion includes a blunt aft end for providing a low velocity region in an aerodynamic wake behind the body for providing a region of low aerodynamic heating; and
   each of said fins having a substantial portion located aft of the aft end of said body; and
   a pair of wing members, each of said wing members being movable between a first position within one of said fairings and a second position extending laterally from said fairing for providing lift at subsonic velocities.

5. An aerospace vehicle as defined in claim 4 further comprising:
   landing gear at the aft end of said body and movable between a first position in the low velocity region of the aerodynamic wake and a second position extending beyond the bottom of said body for landing; and
   attitude control thrust engines mounted on the aft end of the body and movable between a first position beyond the side of said body for control use in space and a second position in the low velocity region of the aerodynamic wake for protection from aerodynamic heating.

6. An aerospace vehicle as defined in claim 5 wherein said landing gear are pivotable so as to describe a conical path between a first position facing aft of said body in the low velocity region of the aerodynamic wake and a second position facing forwardly of said body for landing.

7. An aerospace vehicle comprising:
   a lifting vehicle body including a blunt portion on the aft end thereof for providing a low velocity flow region in an aerodynamic wake behind the body; and
   a pair of landing gears movable from within the wake to a position extending generally downwardly beyond a side of the body for landing, said landing gears being located at the aft end and on opposite sides thereof and extending in the same direction transverse to said body for landing.

8. An aerospace vehicle as defined in claim 7 wherein said landing gear is pivotable about an axis extending transversely of said body to describe a conical path between the first and second positions.

9. An aerospace vehicle as defined in claim 7 further comprising a movable element including an assembly of reaction thrust engines for control of said vehicle in space.

10. A reentry vehicle for use in the hard vacuum of space and also within the atmosphere comprising:
    an aerodynamic lifting body;
    a reaction thrust engine having a nozzle on the aft end of said body for reaction propulsion in hard vacuum of space; and
    means for removing a portion of said nozzle while said engine is operating to cause the propulsion gases to expand to a higher ambient pressure that is less than chamber pressure but higher than vacuum to prevent over expansion when operating in the eath's atmosphere.

11. A reentry vehicle as defined in claim 10 wherein said engine comprises a rocket with a large area ratio expansion bell; and said means for reducing area ratio comprises release means for jettisoning at least a portion of said expansion bell.

12. In combination:
    a substantially symmetrical rocket booster;
    an aerospace vehicle having a body with substantial bilateral aerodynamic symmetry about two orthogonal planes extending longitudinally thereof, mounted on said rocket booster for minimized side loading during launching;
    a pair of aerodynamic structures symmetrically located on opposite sides of said body substantially along one of the planes of symmetry for providing lift at hypersonic velocities without disturbing launch symmetry; and
    a pair of fins, each of said fins being mounted on the outboard edge of one of said structures and extending generally in the direction that lift would be produced.

13. An aerospace vehicle comprising:

a body having substantial bilateral aerodynamic symmetry about two orthogonal planes extending longitudinally thereof;
a pair of aerodynamic fairings symmetrically located on opposite sides of said body substantially along one of the planes of symmetry for providing lift at hypersonic velocities;
said body having a conical portion at the forward end and a cylindrical portion disposed aft thereof;
said cylindrical portion including a blunt aft end for providing a low velocity region in an aerodynamic wake behind the body for providing a region of low aerodynamic heating;
a pair of fins, each of said fins being mounted on outboard edge of one of said fairings and extending generally vertically therefrom;
each of said fins having a substantial portion located aft of the aft end of said body; and
a pair of wing members, each of said wing members being movable between a first position within one of said fairings and a second position extending laterally from said fairing for providing lift at subsonic velocities.

14. An aerospace vehicle as defined in claim 13 further comprising:
landing gear at the aft end of said body and movable between a first position in the low velocity region of the aerodynamic wake and a second position extending beyond the bottom of said body for landing; and
attitude control thrust engines mounted on the aft end of the body and movable between a first position beyond the side of said body for control use in space and a second position in the low velocity region of the aerodynamic wake for protection from aerodynamic heating.

15. An aerospace vehicle as defined in claim 14 wherein; said landing gears are pivotable so as to describe a conical path between a first position facing aft of said body in the low velocity region of the aerodynamic wake and a second position facing forwardly of said body for landing.

16. An aerospace vehicle comprising:
a body having substantial bilateral aerodynamic symmetry about two orthogonal planes extending longitudinally thereof; and
a pair of aerodynamic fairings symmetrically located on opposite sides of said body substantially along one of the planes of symmetry for providing lift at hypersonic velocities;
said body having a conical portion at the forward end and a cylindrical portion disposed aft thereof;
the cylindrical portion including a blunt aft end for providing a low velocity region in an aerodynamic wake behind the body for providing a region of low aerodynamic heating;
attitude control thrust engines mounted on the aft end of the body and movable between a first position beyond the side of said body for control use in space and a second position in the low velocity region of the aerodynamic wake for protection for aerodynamic heating.

17. An aerospace vehicle comprising:
a lifting vehicle body including a blunt portion on the aft end thereof for providing a low velocity flow region in an aerodynamic wake behind the body;
a movable element at the aft end of said body and movable between a first position within the low velocity region of the wake for protection from aerodynamic heating and a second position extending beyond a side of said body for operation of the element;
said movable element comprising a landing gear movable from within the wake to a position extending generally downwardly beyond a side of the body for landing;
said landing gear being pivotable about an axis extending transversely of said body to describe a conical path between the first and second position.

18. An aerospace vehicle comprising:
a lifting vehicle body including a blunt portion on the aft end thereof for providing a low velocity flow region in an aerodynamic wake behind the body;
a movable element at the aft end of said body and movable between a first position within the low velocity region of the wake for protection from aerodynamic heating and a second position extending beyond a site of said body for operation of the element;
said movable element comprising an assembly of reaction thrust engines for control of said vehicle in space.